(12) United States Patent
Owaki et al.

(10) Patent No.: US 6,285,385 B1
(45) Date of Patent: Sep. 4, 2001

(54) ELECTROPHOTOGRAPHIC METHOD AND APPARATUS WHICH EMPLOYS LIGHT BEAM IRRADIATION TO FORM AN ELECTROSTATIC IMAGE ON A SURFACE OF A PHOTOSENSITIVE MEMBER

(75) Inventors: Hironori Owaki, Mishima; Koji Yamazaki, Odawara; Toshiyuki Ehara, Yokohama; Tetsuya Karaki; Kunimasa Kawamura, both of Shizuoka-ken, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,980

(22) Filed: Dec. 21, 1999

(30) Foreign Application Priority Data

Dec. 25, 1998 (JP) .................................. 10-370728

(51) Int. Cl.$^7$ ............................ G03G 15/00; G03G 15/04
(52) U.S. Cl. ............................ 347/132; 347/133; 430/31
(58) Field of Search ............................ 347/131, 132, 347/133; 399/51, 73; 358/298, 300; 430/31

(56) References Cited

U.S. PATENT DOCUMENTS

| 4,265,991 | 5/1981 | Hirai et al. ............................ 430/64 |
| 4,788,120 | 11/1988 | Shirai et al. ............................ 430/66 |
| 5,177,531 | 1/1993 | Miyasaka et al. .................... 355/208 |
| 5,382,487 | 1/1995 | Fukuda et al. ......................... 430/57 |
| 5,983,043 | * 11/1999 | Ohwaki et al. ..................... 399/73 X |

FOREIGN PATENT DOCUMENTS

| 55-8708 | 1/1980 | (JP) . |
| 56-97356 | * 8/1981 | (JP) . |
| 57-115556 | 7/1982 | (JP) . |
| 57-158650 | 9/1982 | (JP) . |
| 60-67951 | 4/1985 | (JP) . |
| 60-95551 | 5/1985 | (JP) . |
| WO 91/18287 | 11/1991 | (WO) . |

* cited by examiner

*Primary Examiner*—Joan Pendegrass
(74) *Attorney, Agent, or Firm*—Fitzpatrick, Cella, Harper & Scinto

(57) ABSTRACT

In the electrophotographic method of the present invention employing a photosensitive member and forming an electrostatic latent image by a charging step and a light beam irradiating step, in order to improve the dot reproducibility in the output image to thereby obtain an image with excellent gradation property, the amount of potential attenuation in the depth direction at light beam irradiation for one pixel of the photosensitive member is set so as to be not less than 65% but less than 135% of the amount of potential attenuation in the depth direction at the continuous light beam irradiation.

19 Claims, 7 Drawing Sheets

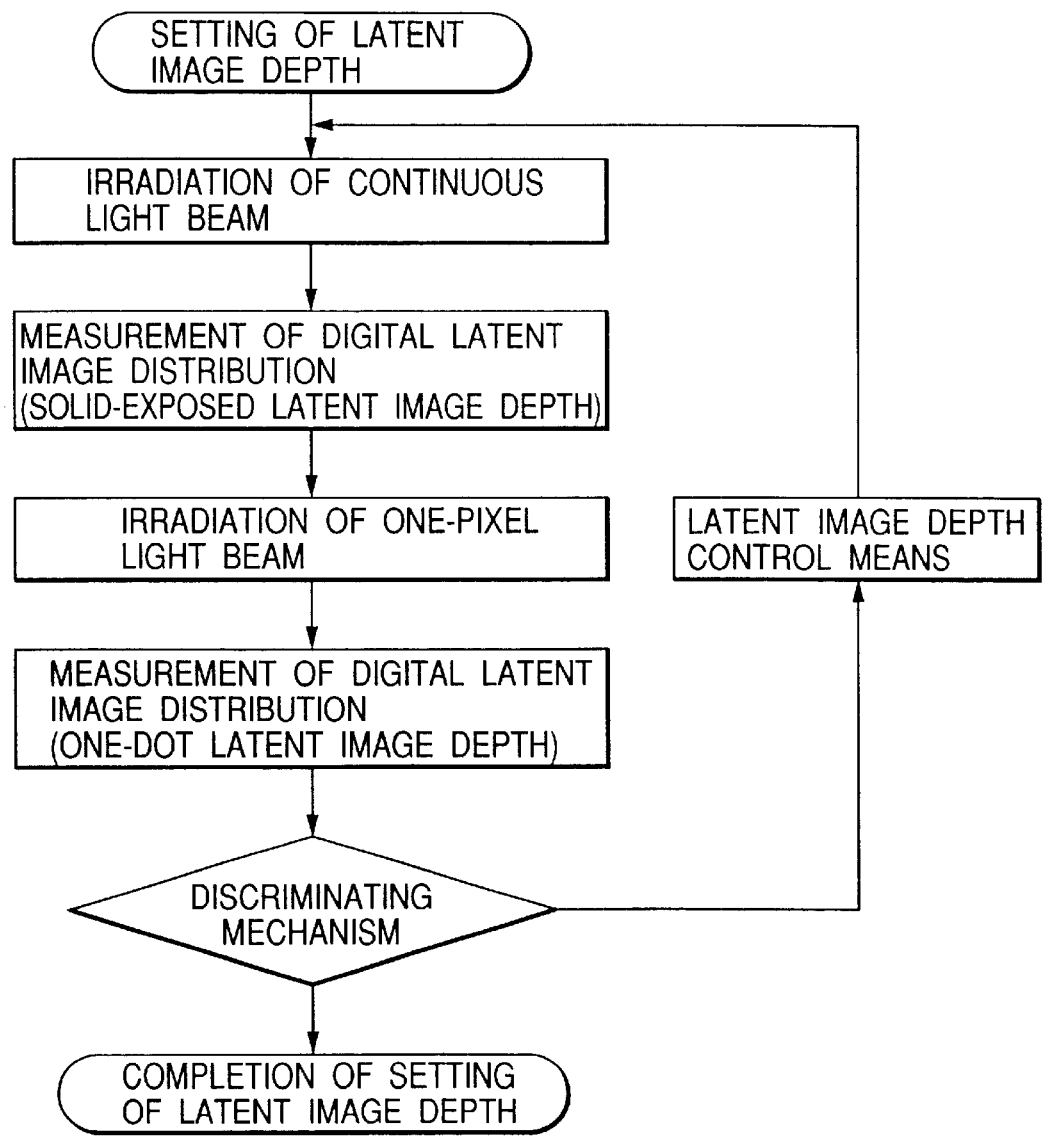

ELECTROPHOTOGRAPHIC METHOD AND APPARATUS WHICH EMPLOYS LIGHT BEAM IRRADIATION TO FORM AN ELECTROSTATIC IMAGE ON A SURFACE OF A PHOTOSENSITIVE MEMBER

BACKGROUND OF THE INVENTION

1. Field of the Invention

The present invention relates to an electrophotographic method and an electrophotographic apparatus, and more particularly to an electrophotographic method and an electrophotographic apparatus suitable for a digital electrophotographic method employing a laser beam printer, a digital copying apparatus or the like and an electrophotographic apparatus therefor.

2. Related Background Art

Electrophotographic apparatus such as laser beam printer or copying apparatus is recently attracting attention of the market because of various features such as high image quality and high printout speed. Also outputs of photographs are rapidly increasing in addition to those of characters, thereby increasing the demand for higher image quality of the electrophotographic apparatus. The photosensitive members employed in such electrophotographic apparatus can be classified into organic type photographic members and inorganic type photographic members.

Organic materials as photoconductive materials employed in the electrophotographic photosensitive members have been actively developed in recent years. Particularly, the function-separated photosensitive member composed of a charge generating layer and a charge transporting layer mutually stacked is already commercialized and is adopted, for example, in the copying apparatus and the laser beam printers.

These photosensitive members have generally been evaluated on the durability. The durability can be divided into physical durability relating to the electrophotographic process such as sensitivity, retentive potential, charging ability, faint image and the mechanical durability such as abrasion or scratch on the surface of the photosensitive member resulting from friction, both being important factors determining the service life of the photosensitive member. Among these, it is already known that the defect on the electrophotographic physical durability, particularly the faint image, results from degradation of the charge transporting substance contained in the surface layer of the photosensitive member, by active substances such as ozone or $NO_x$ generated from the corona charger. It is also known that the defect on the mechanical durability is caused by physical contact and friction of paper, cleaning member such as blade or roller, or toner with the photosensitive layer. In order to improve the electrophotographic physical durability, it is important to employ a charge transporting substance which is not easily degraded by the active substance such as ozone or $NO_x$, and, for this purpose, there is already known to use the charge transporting substance of a high oxidation potential. Also, for improving the mechanical durability, it is important to increase the surface lubricating property to thereby reduce the friction in order to withstand the abrasion by the paper or cleaning member, and to improve the releasing property of the surface in order to prevent filming-melting-adhesion of the toner, and, for this purpose it is already known to mix a lubricant such as fluorinated resin power, fluorinated graphite or polyolefin resin power in the surface layer. However, when the abrasion is significantly lowered, the hygroscopic substances generated by the active substances such as ozone or $NO_x$ are deposited on the surface of the photosensitive member, thereby reducing the surface resistance to induce the lateral movement of the surface charge and result in the faint image (smeared image). Also, since certain abrasion is necessary because of the above-mentioned reason, the potential characteristics such as sensitivity or charging ability inevitably vary in a prolonged period, and the change in the surfacial topography resulting from the abrasion induces light scattering, thereby degrading the image quality.

On the other hand, an example of the inorganic materials employed for the photosensitive member is amorphous silicon (hereinafter, referred to as "a-Si"). In the electrophotographic photosensitive member, the photoconductive material constituting the photosensitive layer is required (1) to have a high sensitivity, a high S/N ratio [photocurrent (Ip)/dark current (Id)] and an absorption spectrum matching the spectral characteristics of the irradiating electromagnetic wave; (2) to have a fast light response and a desired dark resistance; and (3) to be harmless to the human body at the use. The above-mentioned ecological safety at the use is particularly important in case of the photosensitive member to be incorporated into the image forming apparatus for use as an office equipment.

A material meeting these requirements is hydrogenated amorphous silicon (hereinafter, referred to as "a-Si:H"), and application of a-Si:H for the photosensitive member in the image forming apparatus is disclosed, for example, in U.S. Pat. No. 4,265,991. In comparison with the aforementioned organic type photosensitive members, the a-Si:H photosensitive member is provided with various advantages such as (1) very high linearity in the photosensitive characteristics, (2) uniformity in material structure and absence of light scattering, and (3) a high dielectric constant and a strong electric field effect, and is particularly suitable in realizing the high image quality.

Also, U.S. Pat. No. 5,382,487 discloses a photosensitive member, for use in the image forming apparatus, composed of a conductive substrate and a photoconductive layer consisting of a-Si containing halogen atoms (X) as a constituent (hereinafter, referred to as "a-Si:H"). The above-mentioned patent teaches that a heat-resistant photoconductive layer having satisfactory electrical and optical characteristics for use in the photosensitive member for the image forming apparatus can be obtained by adding 1 to 40 atomic % of halogen atoms to a-Si.

Also, in order to improve the electrical, optical and photoconductive characteristics such as dark resistance, photosensitivity and optical response and the environmental characteristics such as moisture resistance in the photoconductive member having a photoconductive layer composed of a deposited a-Si layer, Japanese Patent Application Laid-Open No. 57-115556 discloses a technology of forming a surface layer composed of a non-photoconductive amorphous material containing silicon atoms and carbon atoms on a photoconductive layer composed of an amorphous material containing silicon atoms as a matrix.

Furthermore, Japanese Patent Application Laid-Open No. 60-67951 discloses a technology of stacking a translucent insulating overcoat layer containing amorphous silicon, carbon, oxygen and fluorine on a photosensitive member, and U.S. Pat. No. 4,788,120 discloses a technology of employing in the surface layer an amorphous material containing silicon atoms, carbon atoms and 41 to 70 atomic % of hydrogen atoms as constituents.

Furthermore, Japanese Patent Application Laid-Open No. 57-158650 discloses that a photosensitive member of a high sensitivity and a high resistance for use in the image forming apparatus is obtained by employing a photoconductive layer having a-Si:H containing 10 to 40 atomic % of hydrogen and a ratio of 0.2 to 1.7 in the absorption coefficients of the infrared absorption peaks of 2100 cm$^{-1}$ and 2000 cm$^{-1}$.

On the other hand, Japanese Patent Application Laid-Open No. 60-95551 discloses a technology, for improving the image quality of the amorphous silicon photosensitive member, of executing the image forming steps of charging, exposure and development and transfer while maintaining the temperature in the vicinity of the surface of the photosensitive member at 30° C. to 40° C., thereby preventing the decrease in the surface resistance caused by the moisture absorption on the surface of the photosensitive member and the image smear (high humidity smear) resulting therefrom.

These technologies have improved the electrical, optical and photoconductive characteristics of the photosensitive member for the image forming apparatus and the environmental characteristics thereof, thereby resulting in the improvement in the quality of the formed image.

On the other hand, in the electrophotographic apparatus, there are generally known the digital system and the analog system. In most of the digital electrophotographic systems, a light emitting member (for example, an LED or a semiconductor laser) is turned on and off according to the image signal, and the emitted light is projected onto the photosensitive member. Consequently, the resulting digital latent image is formed with a group of dots (pixel units), and the solid portion, halftone portion and light portion of the image are represented by varying the density of the dots.

The image forming method in the digital electrophotographic system can be divided into two according to the relation between the image information and the exposure unit, one being an image area exposure (hereinafter, referred to as "IAE") method for exposing the image area, the other being a background area exposure (hereinafter, referred to as "BAE") method for exposing the non-image (background) area.

In the BAE method, in order to develop the non-exposed area where the charge remains, there is employed a developer having the same polarity as the charging polarity of the photosensitive member. Since this relationship is the same as in the electrophotographic apparatus of analog system, the BAE method has the advantages of utilizing the developing mechanism, cleaning mechanism, developer and the like common to the electrophotographic apparatus of analog system. On the other hand, in the IAE method, in order to develop the area where the charge is dissipated by exposure, there has to be executed reversal development with the developer of a polarity opposite to the charging polarity of the photosensitive member. Although these two methods are both commercialized, the selection of these methods is often determined by limitation on the photosensitive member and the developer to be employed.

In the above-described digital electrophotographic systems, there may result distortion of dot shape and scattering of developer in the steps of developing, fixing and the like, whereby the satisfactory gradation property of the output image may not be obtained corresponding to the dot density ratio of the digital latent image.

Also, in case of increasing the resolution by reducing the dot size in order to improve the image quality, the development becomes difficult in the pixels of a low density, while in case of the pixels of a high density a sufficient contrast cannot be obtained between pixels because of the increased influence between the adjacent pixels, so that the gradation property of an image tends to become insufficient particularly in the halftone area.

SUMMARY OF THE INVENTION

In consideration of the foregoing, an object of the present invention is to provide an electrophotographic method and an electrophotographic apparatus capable of improving the reproducibility of dots in the output image to provide an image with excellent gradation property.

Another object of the present invention is to provide an electrophotographic method and an electrophotographic apparatus capable of suppressing the distortion in the dot shape and the developer scattering in the electrophotographic steps such as development and fixation, and realizing the gradation property of the output image extremely well corresponding to the dot density of the digital latent image, thereby providing excellent dot reproducibility and gradation property.

Still another object of the present invention is to provide an electrophotographic method which comprises employing a photosensitive member comprising a photoconductive layer as the electrostatic latent image bearing member and executing at least a charging step and a step of irradiating with a light beam each pixel of a pixel matrix composed of a plurality of rows and a plurality of columns according to the image pattern, wherein the amount of potential attenuation for one pixel of the photosensitive member at light beam irradiation is set so as to be not less than 65% but less than 135% of the amount of potential attenuation at continuous light beam irradiation.

Still another object of the present invention is to provide an electrophotographic apparatus comprising: a photosensitive member comprising a photoconductive layer, charging means for charging the photosensitive member, light beam irradiation means for irradiating the charged photosensitive member for forming an electrostatic image thereon with a light beam, and development means for developing the electrostatic image formed by the light beam irradiation, wherein the apparatus further comprises: means for measuring the amount of potential attenuation of the photosensitive member, and latent image depth control means for controlling the latent image depth based on the measured amount of potential attenuation.

BRIEF DESCRIPTION OF THE DRAWINGS

FIG. 2 is a flow chart showing a process for controlling the latent image depth;

DETAILED DESCRIPTION OF THE PREFERRED EMBODIMENTS

In order to attain the aforementioned objects, the present invention have made investigations on the relationship between the potential distribution of the digital latent image on the electrostatic latent image bearing member and the size and shape of dot and the gradation property in the output image, and have found that the dot shape distortion and the developer scattering in the steps of development, fixation and the like can be extremely reduced and the gradation property of the output image can be extremely well corresponded to the dot density ratio of the digital latent image by setting the amount of potential attenuation in the depth direction at light beam irradiation for one pixel of the photosensitive member in a range of not less than 65% but less than 135% of the amount of potential attenuation in the depth direction at continuous light beam irradiation, whereby the present invention has been accomplished.

More specifically, in an electrophotographic method of forming an electrostatic latent image which comprises employing a photosensitive member comprising a photoconductive layer as the electrostatic latent image bearing member and executing at least a charging step and a step of irradiating with a light beam each pixel of a pixel matrix composed of a plurality of rows and a plurality of columns according to the image pattern, the aforementioned objects can be attained by setting the amount of potential attenuation at the light beam irradiation for one pixel of the photosensitive member in a range of not less than 65% but less than 135% of the amount of potential attenuation at continuous light beam irradiation.

Also, in an electrophotographic apparatus comprising: a photosensitive member comprising a photoconductive layer, charging means for charging the photosensitive member, light beam irradiation means for emitting light for forming an electrostatic image on the charged photosensitive member, and development means for developing the electrostatic image formed by the light beam irradiation, the aforementioned objects can be attained by further providing means for measuring the amount of potential attenuation of the photosensitive member, and latent image depth control means for controlling the latent image depth based on the measured amount of potential attenuation.

In the following the present invention will be described in detail by preferred embodiments thereof with reference to the attached drawings.

Figure 1A:
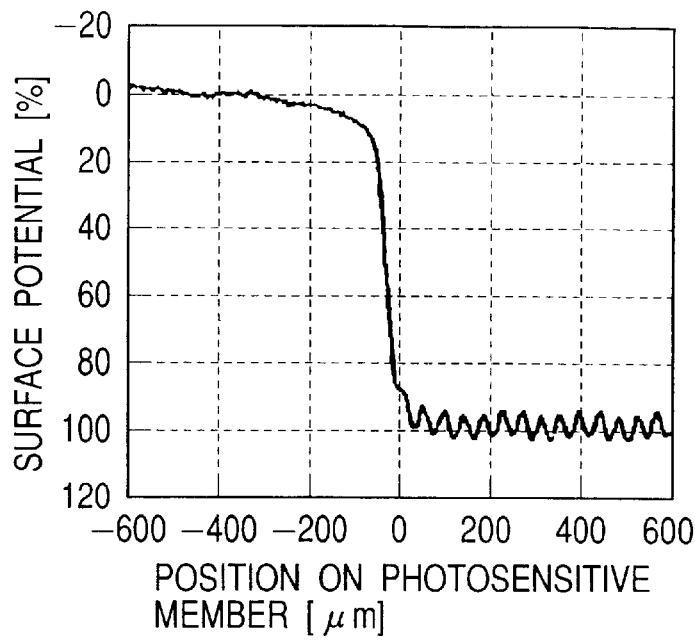
FIGS. 1A and 1B are graphs showing examples of measured latent image distribution, respectively, in a digital latent image formed by continuous light beam irradiation and in a digital latent image formed by one dot light beam irradiation.
Figure 1B:
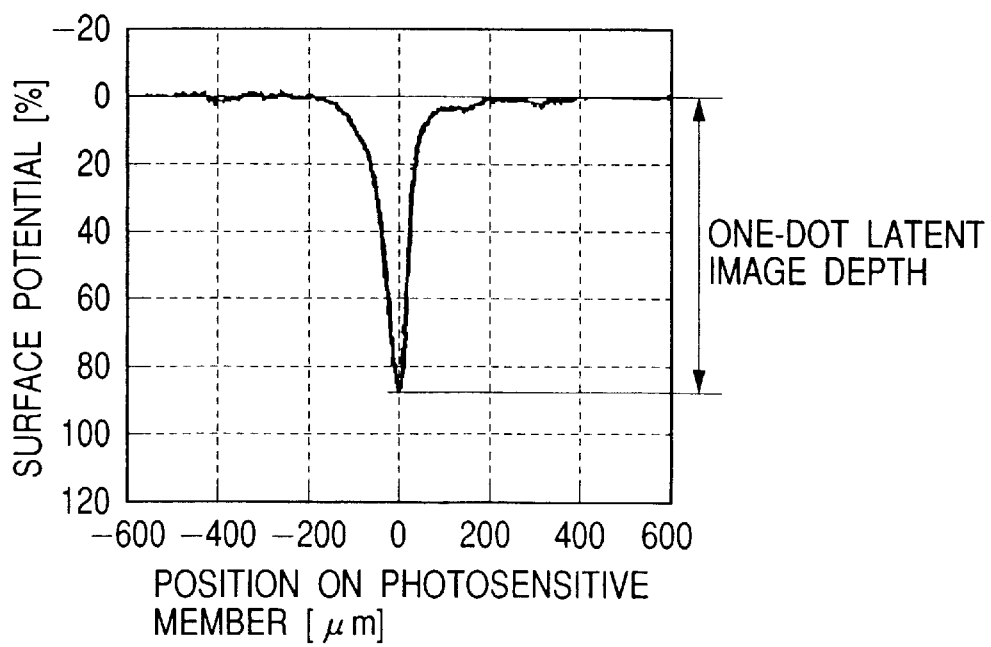

FIGS. 1A and 1B are graphs showing examples of measured latent image distribution, respectively, in a digital latent image formed by continuous light beam irradiation and in a digital latent image formed by one dot light beam irradiation. These data were obtained in the experiments and examples explained later by employing an apparatus shown in FIG. 7 and using an a-Si:H,X photosensitive member of a layered structure shown in FIG. 6C.

FIG. 1A is a graph showing the result of measurement of a digital latent image distribution at continuous light beam irradiation. In FIG. 1A, the abscissa indicates a position on the photosensitive member and continuous light beam irradiation is executed at a positive position with respect to the position 0. The ordinate indicates the surface potential in each position. The data are normalized by the difference between the surface potential at the irradiated position (positive position with respect to position 0) with the continuous light beam and the average surface potential at the non-irradiated position (negative position with respect to position 0). In the present invention, the amount of potential attenuation by the continuous light beam irradiation, that is, a difference between the surface potential at the irradiated position with the continuous light beam and the average surface potential at the non-irradiated position is herein referred to as "solid-exposed latent image depth".

FIG. 1B is a graph showing the result of measurement of a digital latent image distribution at light beam irradiation for one dot (one pixel), in the same scale as in FIG. 1A. Also in FIG. 1B, the abscissa indicates a position on the photosensitive member while the ordinate indicates a surface potential in each position, and the data are normalized as the solid-exposed latent image depth, wherein a light beam of one dot is irradiated at the position 0. In the present invention, the amount of potential attenuation at the light beam irradiation for one pixel means a difference between the surface potential at the irradiated position (position 0) with such one dot light beam and the average surface potential at the non-irradiated position (positive or negative position with respect to position 0). The amount of potential attenuation at the light beam irradiation for one dot is herein referred to as "one dot latent image depth". The word "depth" is used because the surface potential curve extends downwards as shown in FIG. 1B at the irradiating position.

As shown in FIGS. 1A and 1B, the one dot latent image depth is about 85 to 90% of the solid-exposed latent image depth. In the example shown in FIGS. 1A and 1B, the one dot latent image depth falls within the range of not less than 65% but less than 135%, which is defined in the present invention.

In the present invention, there can be obtained advantages of extremely reducing the dot shape distortion and the developer scattering in the steps of development, fixation and the like and of obtaining the gradation property of the output image extremely well corresponding to the dot density ratio of the digital latent image, by controlling the one dot latent image depth within a range of not less than 65% but less than 135%. In particular, the one dot latent image depth is preferably within a range of not less than 75% but less than 120% of the solid-exposed latent image depth, and more preferably within a range of not less than 85% but less than 110%.

In the following there will be explained with reference to a flow chart shown in FIG. 2, an example of the preferred control method for controlling the latent image depth as explained above.

As shown in FIG. 2, at first a continuous light beam irradiation is executed, and the distribution of thus formed digital latent image (solid-exposed latent image depth) is measured. Then a light beam irradiation for one pixel is executed, and the distribution of thus formed digital latent image (one dot latent image depth) is measured. Based on these results, there is discriminated whether the one dot latent image depth is within a range of not less than 65% but less than 135% of the solid-exposed latent image depth. When this condition is not satisfied, the one dot latent image depth is varied to an arbitrary level by the control of the latent image depth such as control on the amount of the irradiating light beam, control on the spot diameter or control on the wavelength through the control on the temperature of the laser element, and the result is confirmed by repeated measurement. When the above condition is satisfied, the setting of the latent image depth is completed.

In the present invention, as explained in FIGS. 1A, 1B and 2, it is necessary to measure the digital latent image depth. This measurement is achieved for example by a method of electrically measuring the latent image distribution with a probe electrode (hereinafter referred to as "latent image distribution measuring method").

Figure 3:
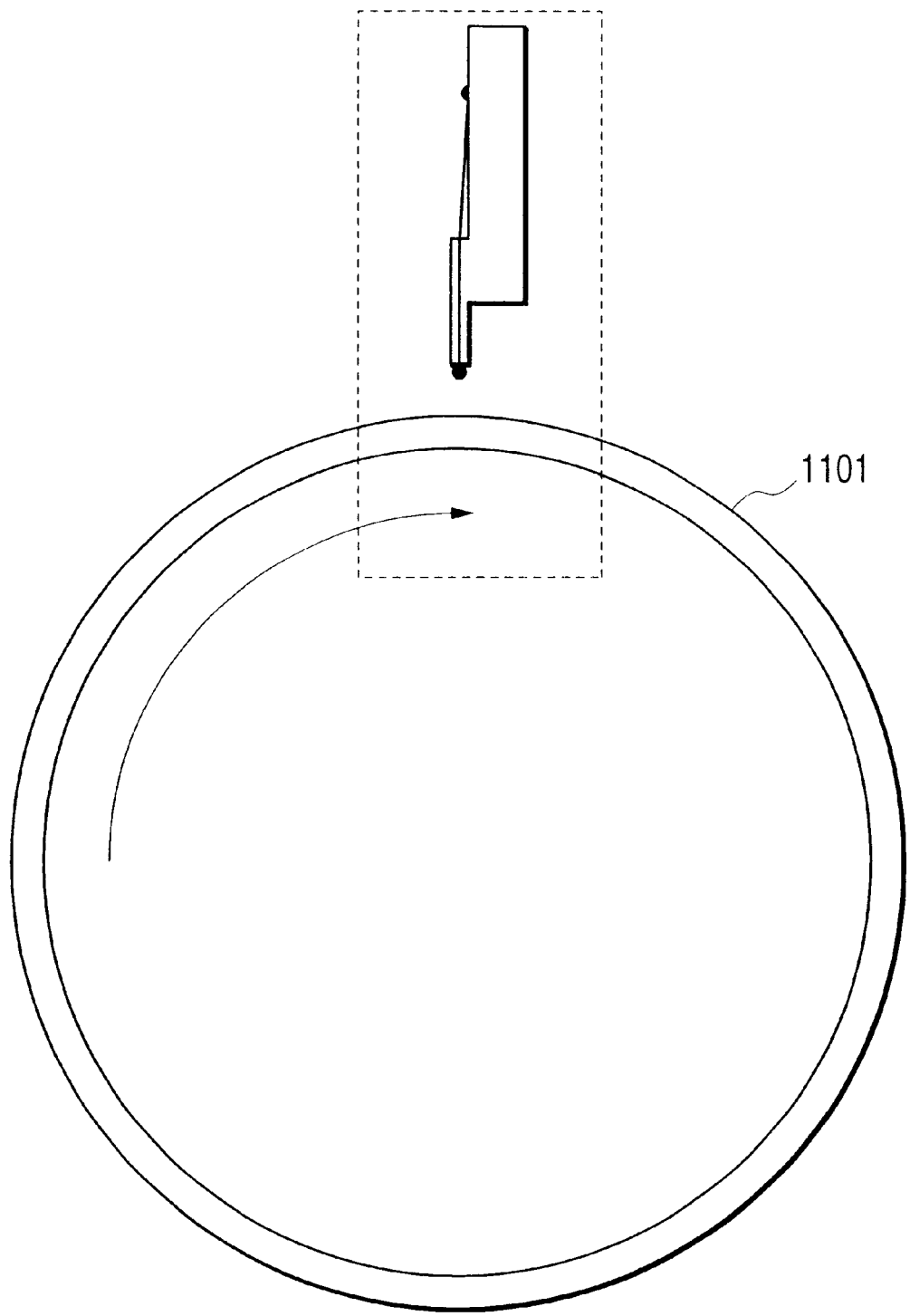
FIG. 3 is a schematic view for explaining an example of the method for measuring the latent image distribution.
Figure 4:
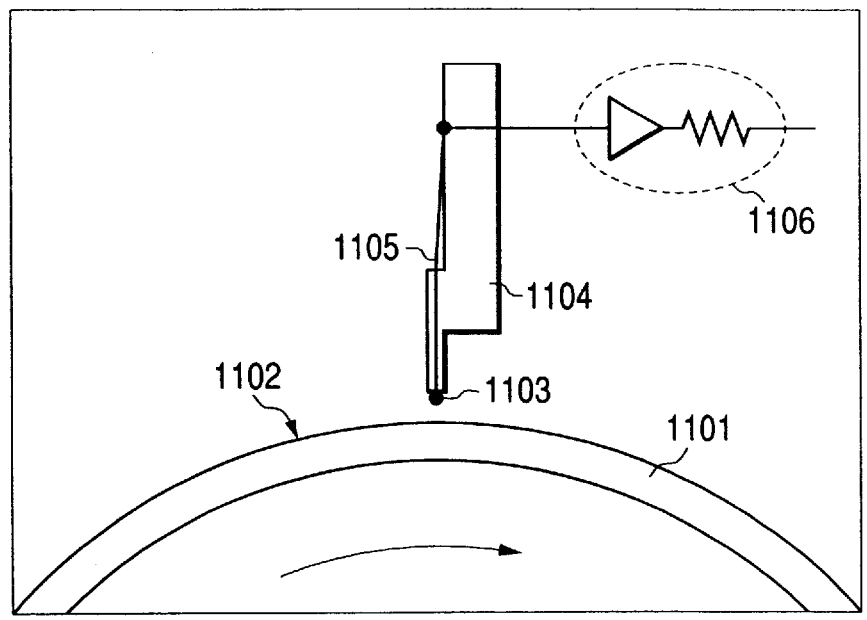
FIG. 4 is a schematic magnified view of a potential sensor shown in a portion surrounded by a broken-line of FIG. 3.
Figure 5:
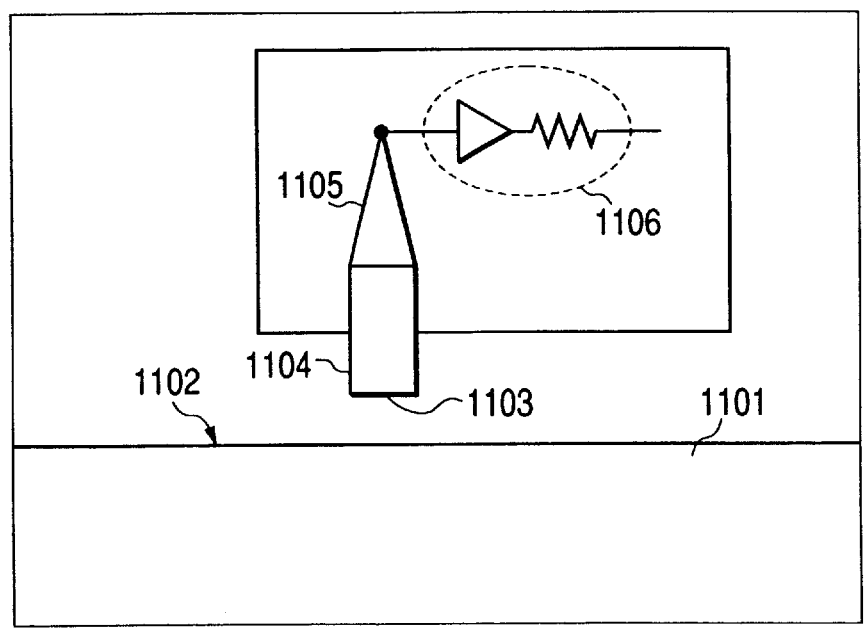
FIG. 5 is a schematic view of the potential sensor shown in FIG. 4, seen from the left.

FIG. 3 is a schematic view showing an example of the latent image distribution measuring method. FIG. 4 is a schematic magnified view of a potential sensor for measuring the latent image distribution, shown in FIG. 3, and FIG. 5 is a schematic view of the potential sensor shown in FIG. 4, seen from the left. In FIGS. 3 to 5, there are shown a cross section 1101 of the photosensitive drum having a surface 1102 showing potential change, and a potential sensor 1103. In this latent image distribution measuring method, the potential sensor 1103 is provided with a cylindrical metal wire. A support member 1104 supports the potential sensor 1103, which is connected by a wire 1105 to a circuit element 1106.

When a relative movement is generated between the potential sensor 1103 and the surface 1102 on which a latent image distribution is formed, an induction current proportional to $dV/dt=(dV/dx)\times(dx/dt)$ is generated in the potential sensor 1103, wherein $dV$ is the variation amount in surface potential and $dx/dt$ is the speed of the relative movement. Since the speed of relative movement is generally constant, the detected induction current contains information on the slope of the surface potential. The latent image distribution can be measured by analyzing such information.

As shown in FIGS. 4 and 5, the potential sensor 1103 is preferably provided with a width of the detecting portion smaller than the width of potential change to be measured, wherein the detecting portion is composed of a rod-shaped conductive member positioned horizontally with respect to the surface to be measured, and is provided with a shield on the conductive member except for the surface thereof opposed to the surface to be measured, in order that the induction current is induced from only the face opposed to the surface to be measured. The potential sensor 1103 of the above-described configuration is so positioned as to be opposed to the surface to be measured and is moved relative thereto, thereby generating an induction current in the potential sensor 1103 and such induction current is analyzed, whereby the induction current from the latent image distribution can be detected without distortion by the shape effect of the potential sensor 1103 and the latent image distribution can therefore be measured extremely precisely.

In addition to the foregoing method, Japanese Patent Application Publication No. 5-508708 discloses certain means for measuring the latent image distribution, and these methods are also applicable to the present invention though the precision of measurement is somewhat lowered.

In the present invention, the electrostatic latent image bearing member is composed of a photosensitive member comprising a photoconductive layer, preferably an a-Si based-photosensitive member having a photoconductive layer composed of a-Si as a main component. FIGS. 6A to 6D are schematic cross-sectional views for showing various layer structures of the a-Si based-photosensitive member.

Figure 6A:
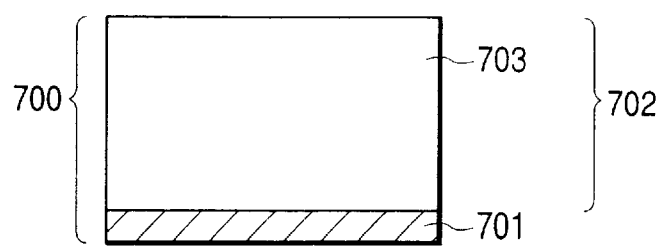
FIGS. 6A, 6B, 6C and 6D are schematic cross-sectional views showing various layered structures of the a-Si photosensitive member.

In a photosensitive member 700 shown in FIG. 6A, a supporting member 701 is provided thereon with a photosensitive layer 702, which is composed of a photoconductive layer 703 consisting of a-Si:H, X (amorphous silicon containing hydrogen atoms and/or halogen atoms) and showing photoconductivity.

Figure 6B:
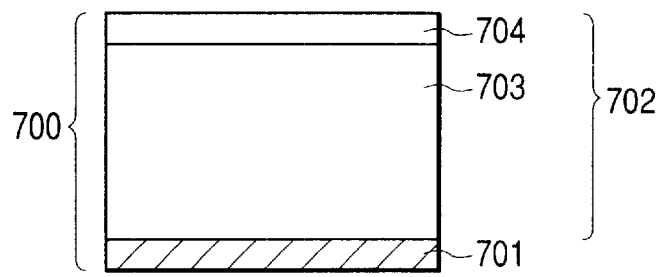

In a photosensitive member 700 shown in FIG. 6B, a surface layer 704 is further provided on the photoconductive layer 703, and the photosensitive layer 702 is composed of the photoconductive layer 703 and the surface layer 704.

Figure 6C:
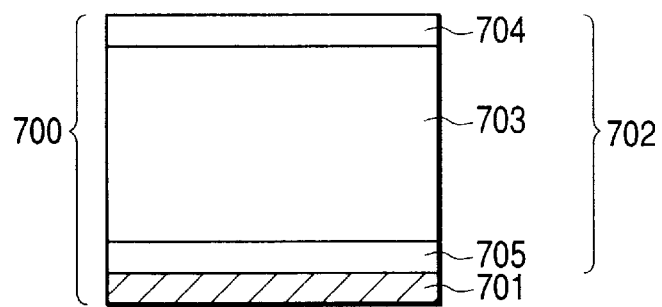

In a photosensitive member 700 shown in FIG. 6C, a charge injection inhibiting layer 705 based on a-Si is further provided between the supporting member 701 and the photoconductive layer 703, and the photoconductive layer 702 is composed of the charge injection inhibiting layer 705, photoconductive layer 703 and surface layer 704.

Figure 6D:
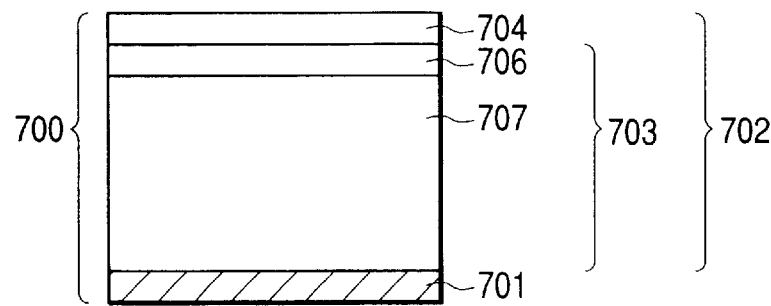

In a photosensitive member 700 shown in FIG. 6D, a charge generating layer 706 composed of a-Si:H,X is further provided between the photoconductive layer 703 and the a-Si surface layer 704, and the photosensitive layer 702 is composed of the charge injection inhibiting layer 705, photoconductive layer 703, surface layer 704 and charge generating layer 706.

The surface layer 704 can be formed by preferably using an amorphous material such as a-Si or a-C.

In the a-Si based-photosensitive member of the above-described layered structure, the photosensitive layer advantageously has a thickness within a range of 5 to 50 $\mu$m and a ten point-averaged surface roughness Rz defined in the JIS standard B061 within a range of 0.05 to 4 $\mu$m, in consideration of the electrostatic and electrophotographic characteristics.

The photosensitive member employing a-Si:H for use in the image forming apparatus, is generally formed by heating a conductive supporting member at a temperature of 50° to 400° C. and forming a photoconductive layer comprising a-Si on the supporting member by using a film forming method such as sputtering, ion plating, thermal CVD, photo CVD or plasma CVD (hereinafter referred to as "PCVD") method. Among these, particularly preferred is the PCVD method in which a raw material gas is decomposed by DC, high frequency or microwave glow discharge to form a deposited film of a-Si on the supporting member.

The electrophotographic apparatus of the present invention has at least a photosensitive member, charging means, light beam irradiation means and developing means and further means for measuring the amount of potential attenuation in the thickness direction of the photosensitive member and latent image depth control means for controlling the latent image depth based on the measured amount of potential attenuation. The electrophotographic method of the present invention explained in the foregoing can be suitably executed by using the apparatus having the above constitution.

Figure 7:
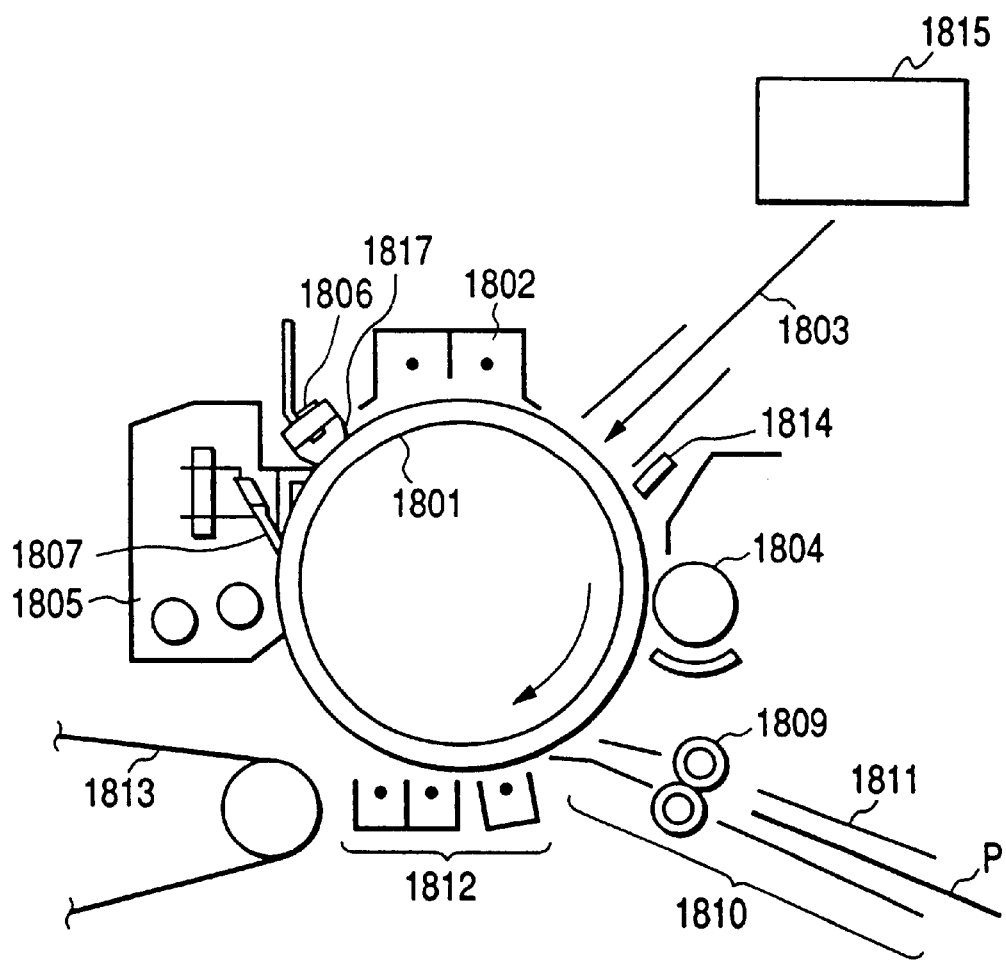
FIG. 7 is a schematic view showing an example of the image forming process employing the electrophotographic apparatus of the present invention.

FIG. 7 is a schematic view showing an example of the image forming process by u sing the electrophotographic apparatus of the present invention. In the illustrated example, around and close to a rotary cylindrical photosensitive member 1801 positioned perpendicularly to the plane of the drawing and rotated in a direction indicated by an arrow, there are provided a main charger 1802, an image forming light beam 1803, a developing unit 1804, a transfer sheet conveying system 1810, a transfer/separation charger 1812, a cleaning device 1805, a main charge eliminating light source 1806 and a conveying system 1813. Numeral 1817 denotes a stray light preventing plate.

The photosensitive member 1801 is uniformly charged by the main charger 1802, and is irradiated with the image forming light beam 1803 having the information of the original image, whereby an electrostatic latent image is formed on the photosensitive member 1801. The latent image is developed into a visible image, that is, a toner image, by the supply of toner from the developing unit 1804.

On the other hand, the transfer material P is supplied through a transfer sheet path 1811, a transfer sheet supply system 1810 consisting of registration rollers 1809, toward the photosensitive member 1801, and the transfer material is given, from the rear side, an electric field of a polarity opposite to that of the toner in the gap between the transfer charger 1812 and the photosensitive member 1801, whereby the toner image is transferred from the surface of the photosensitive member to the transfer material P.

The separated transfer material P is conveyed through the transfer sheet feed system 1813 to a fixing device (not shown in the drawings) in which the toner image is fixed to the transfer material P, and is then discharged from the apparatus.

The toner not contributing to the image transfer or not transferred in the transfer position to thereby remain on the surface of the photosensitive member reaches the cleaner 1805 and is cleaned therein with a cleaning blade 1807, and the photosensitive member 1801 thus refreshed by cleaning is exposed to the charge eliminating light from the main charge eliminating light source 1806 and is used again in a next image forming process.

In FIG. 7, there are shown potential attenuation amount measuring means 1814 and latent image depth control means 1815. These means can be used for controlling the latent image depth according to the flow chart shown in FIG. 2. More specifically, in the present embodiment, the latent image depth is controlled by varying the spot diameter of the irradiating light beam, based on the measured results of the solid-exposed latent image depth and the one dot latent image depth.

Figure 8:
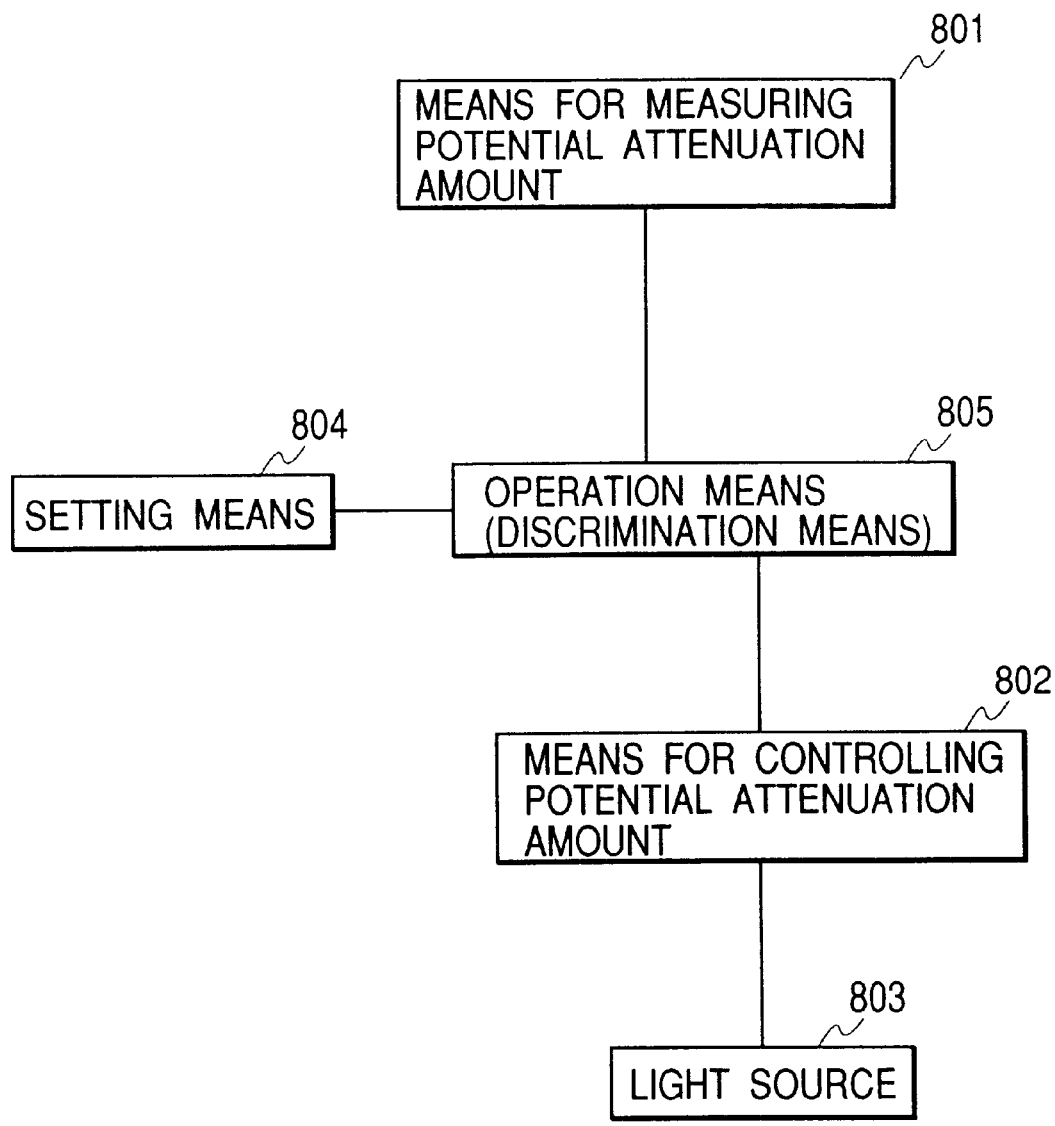
FIG. 8 is a block diagram showing an example of the mechanism for controlling the latent image depth.

FIG. 8 shows an example of the relationship between the potential attenuation amount measuring means 801, the potential attenuation amount control means 802, the light source 803, potential attenuation amount setting means 804 and operation means 805.

For example, based on the potential measured by the potential attenuation amount measuring means 801 according to the flow chart shown in FIG. 2, the operation means 805 discriminates whether the measured potential attenuation amount is in a numeral range set by the setting means 804, and the potential attenuation amount control means 802 controls the driving parameters for the light source 803 according to the result of discrimination, thereby obtaining the desired latent image depth.

The desired range of the latent image depth may be set in advance in the setting means 804 or may be suitably set therein by variable inputs. Also the operation means 805 may be a part of a central processing unit (CPU) for controlling the entire electrophotographic apparatus or may be incorporated into the control system of another apparatus.

In the following the present invention will be further described by experiments and examples, but the present invention is by no means limited by such experiments and examples.

Experiment 1

The relationship between the one dot latent image depth and the gradation property in the output image was investigated in the apparatus shown in FIG. 7, provided that the stray light preventing plate 1817 is not provided in the apparatus, by utilizing an a-Si photosensitive member of a layered configuration shown in FIG. 6C, charge eliminating light of a wavelength of 700 nm, image forming light of a wavelength of 680 nm, while rotating the photosensitive member with a surface moving speed of 300 mm.sec.

In the present experiment, the one dot latent image depth was varied by regulating the amount of irradiating light beam and the spot diameter. The output image was evaluated for the reproducibility of isolated dot having a dot density of 10% or less, the reproducibility of dot in a halftone area having a dot density of about 50%, the reproducibility of dot in a dense area having a dot density of 90% or more, and the toner scattering, and the gradation property was evaluated, and overall evaluation was conducted in view of each evaluation. The results are shown in Table 1.

TABLE 1

| One dot latent image depth | Dot reproducibility | | | Toner scattering | Overall evaluation |
|---|---|---|---|---|---|
| | Isolated dot | Halftone area | Dense area | | |
| 39% | x | x | ⊚ | x | x |
| 52% | x | x | ⊚ | x | x |
| 56% | x | Δ | ⊚ | Δ | X |
| 65% | Δ | o | ⊚ | Δ | Δ |
| 74% | o | o | ⊚ | o | o |
| 87% | ⊚ | ⊚ | o | o | o |
| 97% | ⊚ | ⊚ | o | o | o |
| 108% | ⊚ | ★ | o | ⊚ | o |
| 135% | ★ | ★ | Δ | ⊚ | Δ |
| 143% | ★ | ★ | x | ⊚ | x |

Criteria of evaluation:
★ Most excellent
⊚ More excellent
o Excellent
Δ No practical problem
x Practical problem in some cases.

As clearly seen from Table 1, the dot reproducibility in the isolated dot and in the halftone area, and the toner scattering become better with an increase in the one dot latent image depth. However, the dot reproducibility in the dense area becomes worse with an increase in the one dot latent image depth as the gap becomes more conspicuous. Thus, this experiment has clarified that the one dot latent image depth is preferably set within a range of not less than 65% but not more than 135% of the solid-exposed latent image depth.

Experiment 2

In the present experiment, evaluations were executed in the same manner as in Experiment 1 by employing the same apparatus as in Experiment 1, provided that the wavelength of the image forming light was varied within a range of 470 nm to 790 nm under the condition of obtaining the overall best image in Experiment 1 (condition (1) where the one dot latent image depth=97%) and under the condition of obtaining the somewhat inferior image (condition (2) where the one dot latent image depth=74%). The obtained results are shown in Table 2.

TABLE 2

| | | (condition (1)) | | | | |
|---|---|---|---|---|---|---|
| Image forming light wavelength (nm) | One dot latent image depth | Dot reproducibility | | | Toner scattering | Overall evaluation |
| | | Isolated dot | Halftone area | Dense area | | |
| 470 | 101% | ⊚ | ⊚ | o | o | o |
| 540 | 99% | ⊚ | ⊚ | o | o | o |
| 635 | 98% | ⊚ | ⊚ | o | o | o |
| 655 | 97% | ⊚ | ⊚ | o | o | o |
| 680 | 97% | ⊚ | ⊚ | o | o | o |
| 750 | 90% | ⊚ | ⊚ | o | o | o |
| 790 | 76% | o | o | ⊚ | o | o |

TABLE 2-continued (condition (2))

| Image forming light wavelength (nm) | One dot latent image depth | Dot reproducibility | | | Toner scattering | Overall evaluation |
|---|---|---|---|---|---|---|
| | | Isolated dot | Halftone area | Dense area | | |
| 470 | 80% | ⊚ | ⊚ | ○ | ○ | ○ |
| 540 | 78% | ○ | ○ | ○ | ○ | ○ |
| 635 | 77% | ○ | ○ | ○ | ○ | ○ |
| 655 | 75% | ○ | ○ | ⊚ | ○ | ○ |
| 680 | 74% | ○ | ○ | ⊚ | ○ | ○ |
| 750 | 65% | Δ | ○ | ⊚ | Δ | Δ |
| 790 | 50% | x | x | ⊚ | x | x |

Criteria of evaluation:
★ Most excellent
⊚ More excellent
○ Excellent
Δ No practical problem
x Practical problem in some cases.

As shown in Table 2, the one dot latent image depth decreases with an increase in the wavelength of the image forming light. This is presumably because the light of a longer wavelength penetrates deeper in the photosensitive member, whereby the latent image is formed through a step of diffusion of the photo-generated carriers toward the surface, so that the latent image distribution becomes broader with a longer wavelength under the light irradiation of the same condition.

Also, as clearly seen from Table 2, with the light beam irradiation under the same condition, the obtained image becomes worse with the light of a longer wavelength under either condition. This result indicates that the latitude of the light beam irradiating condition for obtaining the optimum image is narrower for the light of a longer wavelength, so that the wavelength of the image forming light is preferably not longer than 750 nm.

Experiment 3

In the present experiment, evaluations were executed in the same manner as in Experiment 1 by employing the same apparatus as in Experiment 1, provided that the moving speed of the surface of the photosensitive member was varied within a range of 150 to 600 mm/sec under the condition of obtaining the overall best image in Experiment 1 (condition (1) where the one dot latent image depth=97%) and under the condition of obtaining the somewhat inferior image (condition (2) where the one dot latent image depth= 74%). At each moving speed, evaluation was made under a condition where the potential of the dense area was the same as the potential of the light area (irradiated with the continuous light beam), and therefore in the apparatus employed in the present experiment, a significant evaluation could not be obtained at a moving speed larger than 600 mm/sec because satisfactory image could not be obtained due to apparent ghost phenomenon. The obtained results are shown in Table 3.

TABLE 3

(condition (1))

| Photosensitive member surface moving speed (mm/sec) | One dot latent image depth | Dot reproducibility | | | Toner scattering | Overall evaluation |
|---|---|---|---|---|---|---|
| | | Isolated dot | Halftone area | Dense area | | |
| 150 | 78% | ○ | ○ | ○ | ○ | ○ |
| 200 | 93% | ⊚ | ⊚ | ○ | ○ | ○ |
| 250 | 95% | ⊚ | ⊚ | ○ | ○ | ○ |
| 300 | 97% | ⊚ | ⊚ | ○ | ○ | ○ |
| 400 | 97% | ⊚ | ⊚ | ○ | ○ | ○ |
| 500 | 98% | ⊚ | ⊚ | ○ | ○ | ○ |
| 600 | 99% | ⊚ | ⊚ | ○ | ○ | ○ |

(condition (2))

| Photosensitive member surface moving speed (mm/sec) | One dot latent image depth | Dot reproducibility | | | Toner scattering | Overall evaluation |
|---|---|---|---|---|---|---|
| | | Isolated dot | Halftone area | Dense area | | |
| 150 | 49% | x | x | ⊚ | x | x |
| 200 | 67% | Δ | ○ | ⊚ | Δ | Δ |
| 250 | 72% | ○ | ○ | ⊚ | ○ | ○ |
| 300 | 75% | ○ | ○ | ⊚ | ○ | ○ |
| 400 | 77% | ○ | ○ | ○ | ○ | ○ |
| 500 | 78% | ○ | ○ | ○ | ○ | ○ |
| 600 | 79% | ○ | ○ | ○ | ○ | ○ |

Criteria of evaluation:
★ Most excellent
⊚ More excellent
○ Excellent
Δ No practical problem
x Practical problem in some cases.

As shown in Table 3, the one dot latent image depth became smaller with a decrease in the moving speed of the surface of the photosensitive member. This is presumably because the latent image formed by the light beam irradiation is perturbed before arriving at the measuring position. These results indicate that the moving speed of the surface of the photosensitive member is preferably 200 mm/sec or more.

Experiment 4

In the present experiment, evaluations were executed in the same manner as in Experiment 1 by employing the same apparatus and conditions as those in Experiment 1, provided that only the image forming system was changed to BAE, thereby conducting comparison of IAE and BAE. The obtained results are shown in Table 4.

TABLE 4

| Image forming system | One dot latent image depth | Dot reproducibility | | | Toner scattering | Overall evaluation |
|---|---|---|---|---|---|---|
| | | Isolated dot | Halftone area | Dense area | | |
| IAE | 97% | ⊚ | ⊚ | ○ | ○ | ○ |
| BAE | 97% | ⊚ | ⊚ | ★ | ⊚ | ⊚ |

Criteria of evaluation:
★ Most excellent
⊚ More excellent
○ Excellent
Δ No practical problem
x Practical problem in some cases.

As clearly seen from Table 4, the BAE system is superior in the dot reproducibility in the dense area and in the toner scattering, and thus in the overall evaluation. With respect to the dot reproduction in the dense area, this is presumably because the gap between the dots becomes less conspicuous in the BAE system since the gap between dots corresponds to the continuous light beam irradiating area in the IAE system while it corresponds to the non-irradiated area in the BAE system. Also, with respect to the toner scattering, the BAE system is considered advantageous because development in the IAE system is conducted in the area of a low potential while development in the BAE system is conducted in the area of a high potential. The results of the present experiment indicate that the effects of the present invention can be more fully exhibited when the BAE system is employed for image formation.

Experiment 5

In the present experiment, evaluations were executed in the same manner as in Experiment 1 by employing the same apparatus and conditions as those in Experiment 1, provided that only the irradiating conditions of the charge eliminating light was varied. The irradiating conditions of the charge eliminating light was varied, taking the conditions of Experiment 1 (irradiation with the light of 700 nm directly toward the center of the photosensitive member) as reference, by (1) positioning a stray light preventing plate between the charge eliminating light source and the surface of the photosensitive member, and (2) varying the incident angle of the charge eliminating light beam with respect to the surface of the photosensitive member within a range of 5° to 60° in the side of rotating direction (i.e., downstream side) of the photosensitive member. An incident angle larger than 60° was difficult to realize in the apparatus of the present experiment. The results of the experiment are shown in Table 5.

TABLE 5

| Stray light preventing plate | Incident angle of charge eliminating light | One dot latent image depth | Dot reproducibility | | | Toner scattering | Overall evaluation |
|---|---|---|---|---|---|---|---|
| | | | Isolated dot | Half-tone area | Dense area | | |
| Absent | ≅0° | 74% | ○ | ○ | ⊚ | ○ | ○ |
| Present | ≅0° | 93% | ⊚ | ⊚ | ○ | ○ | ○ |
| Present | ≅5° | 99% | ⊚ | ⊚ | ○ | ○ | ○ |
| Present | ≅10° | 102% | ⊚ | ⊚ | ○ | ○ | ○ |
| Present | ≅20° | 106% | ⊚ | ★ | ○ | ⊚ | ○ |
| Present | ≅40° | 109% | ⊚ | ★ | ○ | ⊚ | ○ |
| Present | ≅60° | 112% | ⊚ | ★ | ○ | ⊚ | ○ |

Criteria of evaluation:
★ Most excellent
⊚ More Excellent
○ Excellent
Δ No practical problem
x Practical problem in some cases.

These results indicate that the presence of the stray light preventing plate increases the one dot latent image depth and improves the dot reproducibility and the gradation property of the output image. This is presumably because the stray light preventing plate forms more uniform distribution of the charge eliminating light, whereby the distribution of the photocarriers generated by the charge eliminating light is made more uniform and the image forming light gives less influence on the behavior of the photocarriers, so that the one dot latent image is formed very deep and very sharp.

Also, in addition to the presence of the stray light preventing plate, the charge eliminating light beam is inclined to the downstream side to further increase the one dot latent image depth, thereby improving the dot reproducibility and the gradation property of the output image.

EXAMPLE 1

This example was conducted by employing an analog Canon copier NP6750 of the configuration shown in FIG. 7 modified to a digital system including an optical scanning mechanism and by using an a-Si photosensitive member of the configuration shown in FIG. 7C. The charge eliminating light had a wavelength of 700 nm and was irradiated with an incident angle of about 0° without use of the stray light preventing plate. The image forming light was composed of a laser beam of a wavelength of 680 nm, and IAE system was employed for image formation.

In an output image obtained with a dot latent image depth of 90%, there were conducted evaluations on the reproducibility of isolated dot with a dot density not exceeding 10%, the reproducibility of dot in a halftone area with a dot density of about 50%, the reproducibility of dot in a dense area with a dot density of 90% or more, and the toner scattering, and the overall evaluation was conducted in view of the gradation property. The results of the evaluations are shown in Table 6.

EXAMPLE 2

This example was conducted by employing the same apparatus as that in Example 1, except that the wavelength of the charge eliminating light was changed to 450 nm, the light source for the image forming light was composed of an LED of a wavelength of 450 nm, and the moving speed of the surface of the photosensitive member was set at 200 mm/sec. Evaluations were conducted in the same manner as in Example 1 with respect to the output image obtained. in the case of a dot latent image depth of 85%. The obtained results of the evaluations are shown in Table 6.

EXAMPLE 3

This example was conducted by employing the same apparatus as in Example 1, except for using an a-Si photosensitive member of the configuration shown in FIG. 6D, the charge eliminating light with a wavelength of 565 nm, a stray light preventing plate positioned between the charge eliminating light source and the surface of the photosensitive member, a laser of a wavelength of 635 nm as the image forming light source, the BAE system for image formation, and a moving speed of 400 mm/sec of the surface of the photosensitive member. Evaluations were conducted in this same manner as in Example 1 with respect to an output image in the case of a dot latent image depth of 90%. The results of evaluations are shown in Table 6.

This example was conducted by employing the same apparatus as in Example 1, except for using an a-Si photosensitive member of the configuration shown in FIG. 6D, the charge eliminating light with a wavelength of 600 nm, a stray light preventing plate positioned between the charge eliminating light source and the surface of the photosensitive member, an incident angle of the charge eliminating light beam of 45° relative to the surface of the photosensitive member, an LED of a wavelength of 655 nm as the image forming light source, the BAE system for image formation, and a moving speed of 550 mm/sec of the surface of the photosensitive member. Evaluations were conducted in the same manner as in Example 1 with respect to the output image in the case of a dot latent image depth of 95°. The results of the evaluations are shown in Table 6.

Comparative Example 1

Evaluations were conducted in the same manner as in Example 1 with respect to the output image obtained by the apparatus used in Experiment 1 in the case of a dot latent image depth of 55%. The results of evaluations are shown in Table 6.

Comparative Example 2

Evaluations were conducted in the same manner as in Example 1 with respect to the output image obtained by the apparatus used in Experiment 1 in the case of a dot latent image depth of 140%. The results of the evaluations are shown in Table 6.

TABLE 6

|  | Charge eliminating light | | | Image forming light | | | One dot latent image depth | Dot reproducibility | | | Toner scattering | Overall evaluation |
|---|---|---|---|---|---|---|---|---|---|---|---|---|
|  | Wavelength (nm) | Stray light prevent plate | Incident angle | Wavelength (nm) | Light source | Image forming system |  | Isolated dot | Halftone area | Dense area | | |
| Ex. 1 | 700 | Absent | ≅0° | 680 | laser | IAE | 90% | ◎ | ◎ | ○ | ○ | ○ |
| Ex. 2 | 450 | Absent | ≅0° | 450 | LED | IAE | 85% | ◎ | ◎ | ○ | ○ | ○ |
| Ex. 3 | 565 | Present | ≅0° | 635 | laser | BAE | 90% | ◎ | ◎ | ★ | ◎ | ◎ |
| Ex. 4 | 660 | Present | ≅45° | 655 | LED | BAE | 95% | ★ | ◎ | ★ | ◎ | ◎ |
| Com. Ex. 1 | 700 | Absent | ≅0° | 680 | laser | IAE | 55% | x | Δ | ◎ | Δ | x |
| Com. Ex. 2 | 700 | Absent | ≅0° | 680 | laser | IAE | 140% | ★ | x | x | ◎ | x |

Criteria of evaluation:
★ Most excellent
◎ More excellent
○ Excellent
Δ No practical problem
x Practical problem in some cases.

As clearly seen from the data in Table 6, Examples 1 and 2 provided excellent result (○) in the overall evaluation, and Examples 3 and 4 provided more excellent result (◎) in the overall evaluation. On the other hand, in overall evaluation, Comparative Examples 1 and 2 provided results (x) that a practical problem may be generated in some cases.

As explained in the foregoing, according to the present invention, it is possible to extremely reduce the dot shape distortion and the developer scattering in the process steps such as development and fixation, and the gradation property of the output image can be corresponded extremely well to the dot density ratio of the digital latent image, thereby obtaining an image excellent particularly in the dot reproducibility and the gradation property.

What is claimed is:

1. An electrophotographic method which comprises employing a photosensitive member comprising a photoconductive layer as an electrostatic latent image bearing member and forming an electrostatic latent image by at least a charging step and a step of light beam irradiation for each pixel in a pixel matrix composed of a plurality of rows and a plurality of columns according to the image pattern,
   wherein an amount of potential attenuation at light beam irradiation for one pixel of the photosensitive member is set so as to be not less than 65% but less than 135% of an amount of potential attenuation at continuous light beam irradiation.

2. An electrophotographic method according to claim 1, wherein the photoconductive layer is composed of amorphous silicon as a main component.

3. An electrophotographic method according to claim 1, wherein the light beam irradiating step employs light of a wavelength within a range from 450 nm to 750 nm.

4. An electrophotographic method according to claim 1, wherein a moving speed of a surface of the photosensitive member is within a range from 200 mm/sec to 600 mm/sec.

5. An electrophotographic method according to claim 1, wherein an image forming system using a background exposure method of light-exposing a non-image area is employed in the light beam irradiating step.

6. An electrophotographic method according to claim 1, further comprising a pre-exposure step prior to the charging step.

7. An electrophotographic method according to claim 6, wherein a stray light preventing plate is provided at a photosensitive member side of a pre-exposure light source used in the pre-exposure step so as to surround at least a part of a circumference of the pre-exposure light source.

8. An electrophotographic method according to claim 6, wherein the pre-exposure step employs light of a wavelength within a range from 450 nm to 750 nm.

9. An electrophotographic method according to claim 6, wherein a pre-exposure light beam is inclined toward a moving direction of the photosensitive member with an incident angle smaller than 60° with respect to a surface of the photosensitive member.

10. An electrophotographic apparatus comprising:
   a photosensitive member comprising a photoconductive layer, charging means for charging the photosensitive member, and light beam irradiation means for irradiating the charged photosensitive member for forming an electrostatic image thereon with light,
   wherein the apparatus further comprises: means for measuring an amount of potential attenuation of the photosensitive member; and latent image depth control means for controlling a latent image depth based on the measured amount of the potential attenuation, and
   wherein the latent image depth control means is adapted to control the latent image depth based on the amount of potential attenuation at the light beam irradiation for one pixel of the photosensitive member and the amount of potential attenuation at the continuous light beam irradiation.

11. An electrophotographic apparatus according to claim 10, wherein the latent image depth control means has a function of controlling at least one selected from a light amount, a spot diameter and a wavelength of the irradiated light.

12. An electrophotographic apparatus according to claim 10, wherein the latent image depth control means is adapted to control the latent image depth in such a manner that the amount of potential attenuation at the light beam irradiation for one pixel of the photosensitive member is set so as to be not less than 65% but less than 135% of the amount of potential attenuation at the continuous light beam irradiation.

13. An electrophotographic apparatus according to claim 10, wherein the light beam irradiation means includes a light source for emitting light of a wavelength within a range from 450 nm to 750 nm.

14. An electrophotographic apparatus according to claim 10, further comprising a driving source for rotating the photosensitive member in such a manner that an moving speed of a surface thereof is within a range from 200 mm/sec to 600 mm/sec.

15. An electrophotographic apparatus according to claim 10, further comprising pre-exposure means.

16. An electrophotographic apparatus according to claim 15, wherein the pre-exposure means includes a light source for emitting light of a wavelength within a range from 450 nm to 750 nm.

17. An electrophotographic apparatus according to claim 10, wherein the photoconductive layer is composed of amorphous silicon as a main component.

18. An electrophotographic apparatus comprising:
   pre-exposure means;
   a stray light preventing plate provided on at least a part of a circumference of a light source of the pre-exposure means at a photosensitive member side of the light source of the pre-exposure means;
   a photosensitive member comprising a photoconductive layer;
   charging means for charging the photosensitive member; and
   light beam irradiation means for irradiating the charged photosensitive member for forming an electrostatic image thereon with light,
   wherein the apparatus further comprises: means for measuring an amount of potential attenuation of the photosensitive member; and latent image depth control means for controlling a latent image depth based on the measured amount of the potential attenuation, and
   wherein the latent image depth control means is adapted to control the latent image depth based on the amount of potential attenuation at the light beam irradiation for one pixel of the photosensitive member and the amount of potential attenuation at the continuous light beam irradiation.

19. An electrophotographic apparatus comprising:
   pre-exposure means;
   a photosensitive member comprising a photoconductive layer;
   charging means for charging the photosensitive member; and
   light beam irradiation means for irradiating the charged photosensitive member for forming an electrostatic image thereon with light,
   wherein the apparatus further comprises: means for measuring an amount of potential attenuation of the photosensitive member; and latent image depth control means for controlling a latent image depth based on the measured amount of the potential attenuation,
   wherein the latent image depth control means is adapted to control the latent image depth based on the amount of potential attenuation at the light beam irradiation for one pixel of the photosensitive member and the amount of potential attenuation at the continuous light beam irradiation, and
   wherein a light beam from the pre-exposure means is inclined toward a moving direction of the photosensitive member with an incident angle smaller than 60° with respect to a surface of the photosensitive member.

* * * * *

UNITED STATES PATENT AND TRADEMARK OFFICE
CERTIFICATE OF CORRECTION

PATENT NO. : 6,285,385 B1
DATED : September 4, 2001
INVENTOR(S) : Hironori Owaki et al.

It is certified that error appears in the above-identified patent and that said Letters Patent is hereby corrected as shown below:

Column 1,
Line 17, "as" should read -- as a -- .

Column 2,
Line 23, "an" should be deleted.

Column 5,
Line 53, "a-Si:H,X" should read -- a-Si:H, X --.

Column 8,
Line 3, "a-Si:H,X" should read -- a-Si:H, X --.
Line 40, "u sing" should read -- using --.

Column 9,
Line 56, "300 mm.sec." should read -- 300 mm/sec. --.

Column 10,
Table 1, "X" should read -- x --.

Column 14,
Line 36, "obtained." should read -- obtained --.

Column 17,
Line 18, "an" should read -- a --.

Signed and Sealed this

Twenty-sixth Day of March, 2002

Attest:

*Attesting Officer*

JAMES E. ROGAN
*Director of the United States Patent and Trademark Office*